(12) United States Patent
Van Horn et al.

(10) Patent No.: US 8,408,468 B2
(45) Date of Patent: Apr. 2, 2013

(54) METHOD OF AND SYSTEM FOR READING VISIBLE AND/OR INVISIBLE CODE SYMBOLS IN A USER-TRANSPARENT MANNER USING VISIBLE/INVISIBLE ILLUMINATION SOURCE SWITCHING DURING DATA CAPTURE AND PROCESSING OPERATIONS

(75) Inventors: Erik Van Horn, Seaville, NJ (US); Sean Philip Kearney, Marlton, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 108 days.

(21) Appl. No.: 12/966,256

(22) Filed: Dec. 13, 2010

(65) Prior Publication Data

US 2012/0145788 A1   Jun. 14, 2012

(51) Int. Cl.
*G06K 7/10* (2006.01)
(52) U.S. Cl. ......... 235/462.25; 235/462.01; 235/462.32; 235/462.42; 235/462.43
(58) Field of Classification Search ............. 235/462.01, 235/462.09, 462.25, 462.31, 462.32, 462.41–462.45, 235/462.48, 472.01, 462.07
See application file for complete search history.

(56) References Cited

U.S. PATENT DOCUMENTS

| 4,751,396 | A | 6/1988 | Daigle et al. |
| 6,203,069 | B1 | 3/2001 | Outwater et al. |
| 6,538,820 | B2 | 3/2003 | Fohl et al. |
| 6,612,494 | B1 | 9/2003 | Outwater |
| 6,629,640 | B2 * | 10/2003 | Dorris et al. ............. 235/462.01 |
| 6,839,128 | B2 | 1/2005 | Premjeyanth et al. |
| 7,046,346 | B2 | 5/2006 | Premjeyanth et al. |
| 7,420,153 | B2 | 9/2008 | Palmer et al. |
| 7,527,207 | B2 * | 5/2009 | Acosta et al. ............. 235/462.31 |
| 7,546,952 | B2 | 6/2009 | Knowles et al. |
| 7,575,170 | B2 | 8/2009 | Knowles et al. |
| 7,614,560 | B2 | 11/2009 | Knowles et al. |
| 7,715,613 | B2 | 5/2010 | Dobbs et al. |
| 7,744,130 | B2 | 6/2010 | Zazzu et al. |
| 2002/0015145 | A1 | 2/2002 | Numata |
| 2006/0180670 | A1 | 8/2006 | Acosta et al. |
| 2008/0041957 | A1 * | 2/2008 | Kotlarsky et al. ........ 235/462.42 |
| 2008/0063252 | A1 | 3/2008 | Dobbs et al. |
| 2008/0290173 | A1 * | 11/2008 | Kotlarsky et al. ........ 235/462.42 |
| 2009/0101718 | A1 * | 4/2009 | Knowles et al. ......... 235/462.42 |
| 2009/0101719 | A1 * | 4/2009 | Knowles et al. ......... 235/462.42 |
| 2009/0108074 | A1 * | 4/2009 | Vinogradov ............. 235/462.42 |

FOREIGN PATENT DOCUMENTS

| DE | 10309659 A | 1/2004 |
| WO | 0180512 A | 10/2001 |
| WO | 2006060785 A | 6/2006 |

OTHER PUBLICATIONS

Examination Report in EP Application No. 11 192 875.0-2210.

* cited by examiner

*Primary Examiner* — Thien M Le
*Assistant Examiner* — April Taylor
(74) *Attorney, Agent, or Firm* — Summa, Addition & Ashe, P.A.

(57) ABSTRACT

Method of and system for reading visible and/or invisible code symbols in a user-transparent manner using visible/invisible illumination switching during data capture and processing operations.

18 Claims, 8 Drawing Sheets

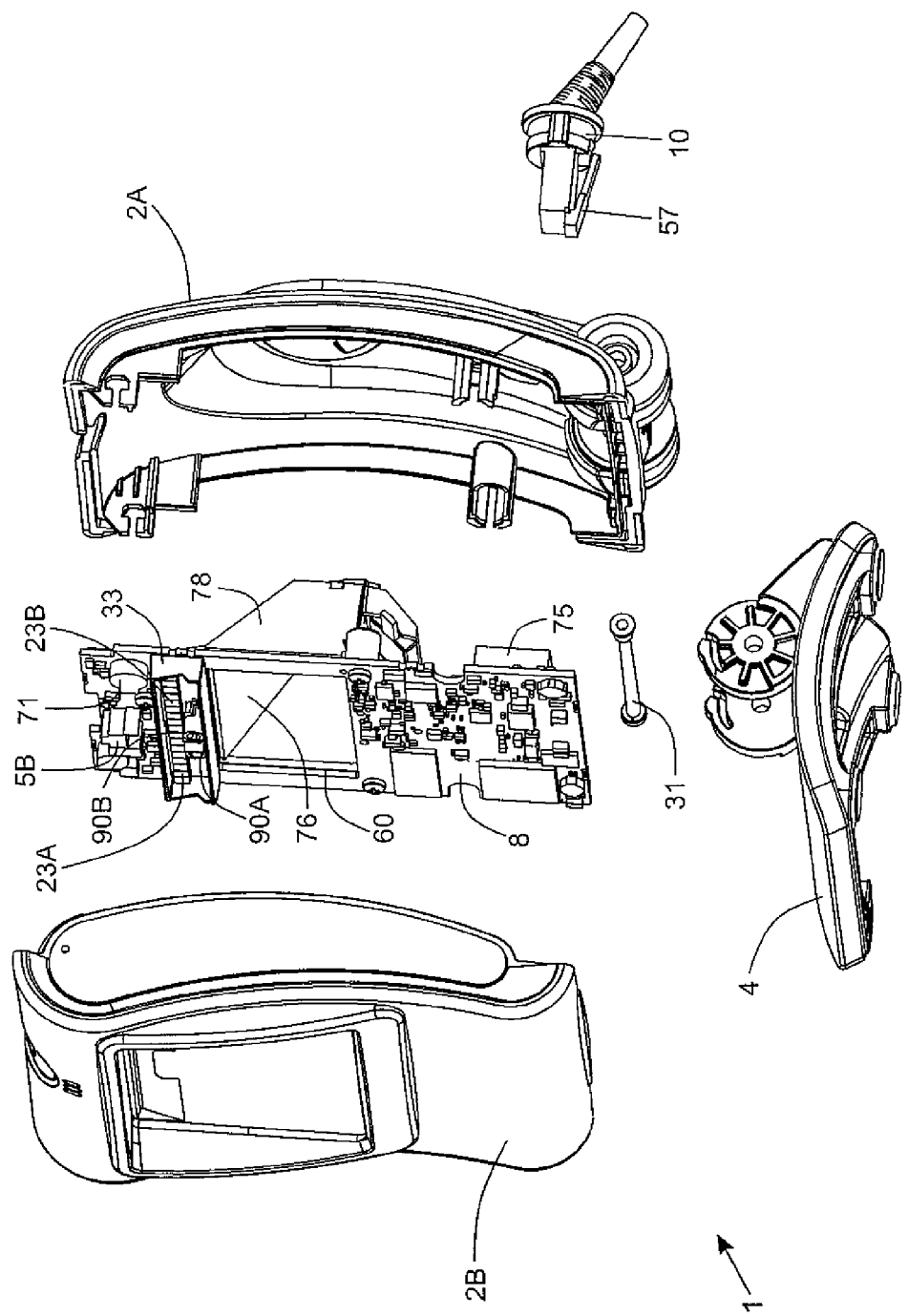

METHOD OF AND SYSTEM FOR READING VISIBLE AND/OR INVISIBLE CODE SYMBOLS IN A USER-TRANSPARENT MANNER USING VISIBLE/INVISIBLE ILLUMINATION SOURCE SWITCHING DURING DATA CAPTURE AND PROCESSING OPERATIONS

BACKGROUND

1. Field of Disclosure

The present disclosure relates to new and improved methods of and systems for reading bar code symbols using visible and invisible sources of illumination during data capture and processing operations.

2. Brief Description of the State of the Art

Today, bar code symbols and labels are used in diverse applications. Typically, a bar code label is printed on a light reflective substrate (e.g. paper) with an ink that is absorptive in the visible-band portion of the electromagnetic spectrum. In such applications, the bar code symbol reader must have a visible source of light (e.g. VLD or visible LED) for reading the visible bar code symbols.

However, in many security-type applications, where access and admission cards and tickets are given out, the security cards bear bar code symbols that are printed with infra-red inks, i.e. inks that reflect only light in the infra-red band portion of the electromagnetic spectrum. In such specialized applications, the bar code symbol reader must have an infra-red (IR) source of light (e.g. IR-LD or IR-LED) for reading such IR-based bar code symbols.

A variety of methods have been developed and disclosed in the following patents and patent application Publications to read bar code symbols using visible and/or visible radiation for object illumination purposes, in particular: U.S. Pat. No. 7,036,735 to Hepworth et al, and US Publication Nos. 2006/0113386, 20080283611A1 and 20090065584A1.

While the digital imaging-based and laser-based systems disclosed in these prior art patents possess the capacity to read visible and invisible bar code symbols, in diverse environments, such system are more complex and costly to manufacture than desired in most applications where there is a practical need to read both visible and invisible bar code symbols, but with a greater sense of economy.

In short, there is great need in the art for new and improved ways of simply and reliably reading bar code symbols using either visible or invisible illumination, in the same application environment, avoiding the shortcomings and drawbacks of the prior art apparatus and methodologies.

OBJECTS AND SUMMARY

A primary object of the present disclosure is to provide a new and improved method of and apparatus for reading bar code symbols using either visible or invisible illumination, avoiding the shortcomings and drawbacks of prior apparatus and methodologies.

Another object of the present invention is to provide a digital imaging based bar code symbol reading system having the capacity to automatically read both visible and invisible bar code symbols in the same application environment, without the complexities and cost presented by prior art techniques and technologies.

Another object of the present invention is to provide an improved method of automatically reading both visible and invisible bar code symbols in the same application environment, using a single digital imaging device that is simple to manufacture and operate.

Another object of the present invention is to provide a new and improved digital-imaging based system for reading visible and/or invisible bar code symbols in a user-transparent manner using visible/invisible illumination switching during digital image capture and processing operations, without the complexities presented by prior art techniques and technologies.

Another object of the present invention is to provide a new and improved laser based scanning system for reading visible and/or invisible bar code symbols in a user-transparent manner using visible/invisible illumination switching during scan data capture and processing operations, without the complexities presented by prior art techniques and technologies.

Another object of the present invention is to provide an improved method of reading both visible and invisible bar code symbols during a single scanning session in most application environments, using a single laser scanning device that is both simple to manufacture and operate.

Another object of the present invention is to provide an improved method of reading both bar code symbols using infrared (IR) illumination which increases the contrast of scanned and imaged security-type bar code symbols printed with IR-reflective ink.

Another object of the present invention is to provide a hand-supportable digital imaging system for reading security-type IR-printed bar code symbols on admission and like passes, wherein such security code symbols appear invisible to the unaided human eye, but which produces decodable black and white (B/W) images of such security codes when imaged using IR illumination.

These and other objects will become apparent hereinafter and in the Claims.

BRIEF DESCRIPTION OF THE DRAWINGS

In order to more fully understand the Objects, the following Detailed Description of the Illustrative Embodiments should be read in conjunction with the accompanying Drawings, wherein:

FIG. 2B is a second perspective/exploded view of the digital-imaging based bar code symbol reading system of the illustrative embodiment shown in FIG. 1;

DETAILED DESCRIPTION OF THE ILLUSTRATIVE EMBODIMENTS

Figure 1:
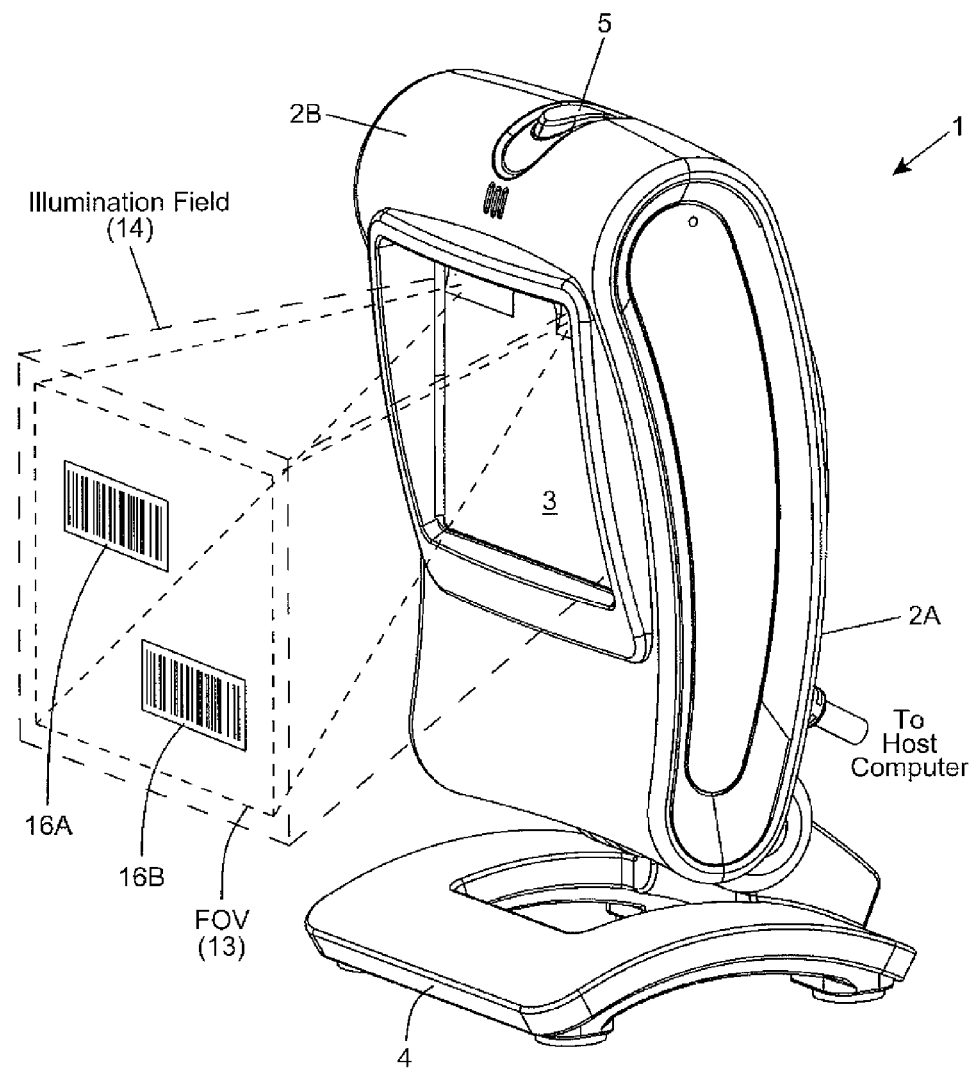
FIG. 1 is a perspective view of an illustrative embodiment of the hand-supportable digital-imaging based bar code symbol reading system, having the capacity to automatically read both visible and invisible bar code symbols, in the same application environment, in a simple and reliable manner, in diverse application environments.

Referring to the figures in the accompanying Drawings, the illustrative embodiments of the bar code symbol reading system and method of the present disclosure will be described in great detail, wherein like elements will be indicated using like reference numerals.

Hand-Supportable Digital-Imaging Bar Code Symbol Reading System of the Illustrative Embodiment Referring now to FIGS. 1 through 3, an illustrative embodiment of the hand-supportable digital-imaging bar code symbol reading system 1 will be described in detail.

As shown in FIGS. 1, 2 and 2B, the digital-imaging bar code symbol reading system of the illustrative embodiment 1 comprises: a hand-supportable housing 2 having (i) a front housing portion 2B with a window aperture 6 and an imaging window panel 3 installed therein; and (ii) a rear housing portion 2A. As shown, a single PC board based optical bench 8 (having optical subassemblies mounted thereon) is supported between the front and rear housing portions 2A and 3B which, when brought together, form an assembled unit. A base portion 4 is connected to the assembled unit by way of a pivot axle structure 131 that passes through the bottom portion of the imager housing and the base portion so that the hand-supportable housing and base portion are able to rotate relative to each other. The host/imager interface cable 10 passes through a port 132 formed in the rear of the rear housing portion, and interfaces with connectors mounted on the PC board 8.

Figure 3:
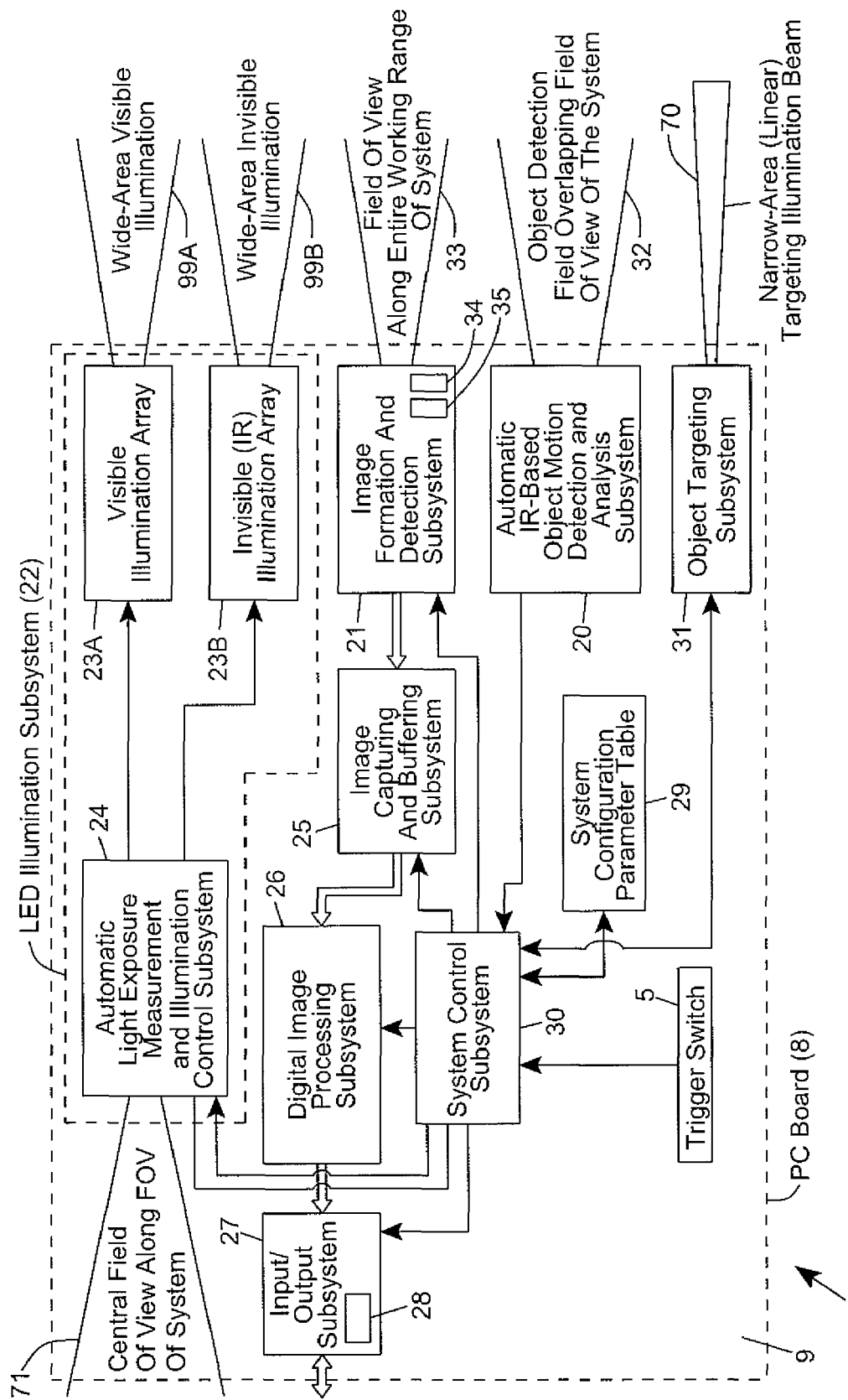
FIG. 3 is a schematic block diagram describing the major system components of the digital-imaging based bar code symbol reading system illustrated in FIGS. 1 through 2B.

As shown in FIG. 3, the digital-imaging based code symbol reading system 1 comprises a number of subsystem components, namely: a digital image formation and detection (i.e. camera) subsystem 21 having image formation (camera) optics 34 for producing a field of view (FOV) upon an object to be imaged and a CMOS or like area-type image detection array 35 for detecting imaged light reflected off the object during illumination operations in an image capture mode in which at least a plurality of rows of pixels on the image detection array are enabled; a LED-based multi-mode illumination subsystem 22 employing a single LED illumination array 23 comprising visible and invisible (infrared) LEDs 23A and 23B, alternatively interspaced along a linear dimension, in the illustrative embodiment (although other arrangements are possible); a narrow-band transmission-type optical filter 40, realized within the hand-supportable and detected by the image detection array 35, for transmitting illumination reflected from the illuminated object, while all other components of ambient light are substantially rejected; an object targeting illumination subsystem 31 as described hereinabove; an IR-based object detection subsystem 20 for producing an IR-based object detection field 32 within the FOV of the image formation and detection subsystem 21; an automatic light exposure measurement and illumination control subsystem 24 for controlling the operation of the LED-based illumination subsystem 22 including the operation of said visible and invisible illumination arrays within said multi-mode illumination subsystem; an image capturing and buffering subsystem 25 for capturing and buffering 2-D images detected by the image formation and detection subsystem 21; a digital image processing subsystem 26 for processing 2D digital images captured and buffered by the image capturing and buffering subsystem 25 and reading 1D and/or 2D bar code symbols represented therein; and an input/output subsystem 27 for outputting processed image data and the like to an external host system or other information receiving or responding device; and a system control subsystem 30 integrated with the subsystems above, for controlling and/or coordinating these subsystems during system operation.

The primary function of the object targeting subsystem 31 is to automatically generate and project a visible linear-targeting illumination beam 70 across the central extent of the FOV of the system in response to either (i) the automatic detection of an object during hand-held imaging modes of system operation, or (ii) manual detection of an object by an operator when s/he manually actuates the manual actuatable trigger switch 5. In order to implement the object targeting subsystem 31, the OCS assembly 78 also comprises a fourth support structure for supporting the pair of beam folding mirrors above a pair of aperture slots, which in turn are disposed above a pair of visible LEDs arranged on opposite sites of the FOV optics 34 so as to generate a linear visible targeting beam 70 that is projected off the second FOV folding 75 and out the imaging window 3, as shown and described in detail in US Patent Publication No. US20080314985 A1, incorporated herein by reference in its entirety.

The primary function of the object motion detection and analysis subsystem 20 is to automatically produce an object detection field 32 within the FOV 33 of the image formation and detection subsystem 21, to detect the presence of an object within predetermined regions of the object detection field 32, as well as motion and velocity information about the object therewithin, and to generate control signals which are supplied to the system control subsystem 30 for indicating when and where an object is detected within the object detection field of the system. As shown in FIG. 2B, IR LED 90A and IR photodiode 90B are supported in the central lower portion of the optically-opaque structure 133, below the linear array of visible and invisible LEDs, 23A and 23B, respectively. The IR LED 90A and IR photodiode 90B are used to implement the automatic IR-based object motion detection and analysis subsystem 20.

The image formation and detection (i.e. camera) subsystem 21 includes image formation (camera) optics 34 for providing a field of view (FOV) 33 upon an object to be imaged and a CMOS area-type image detection array 35 for detecting imaged light reflected off the object during illumination and image acquisition/capture operations.

Figure 4:
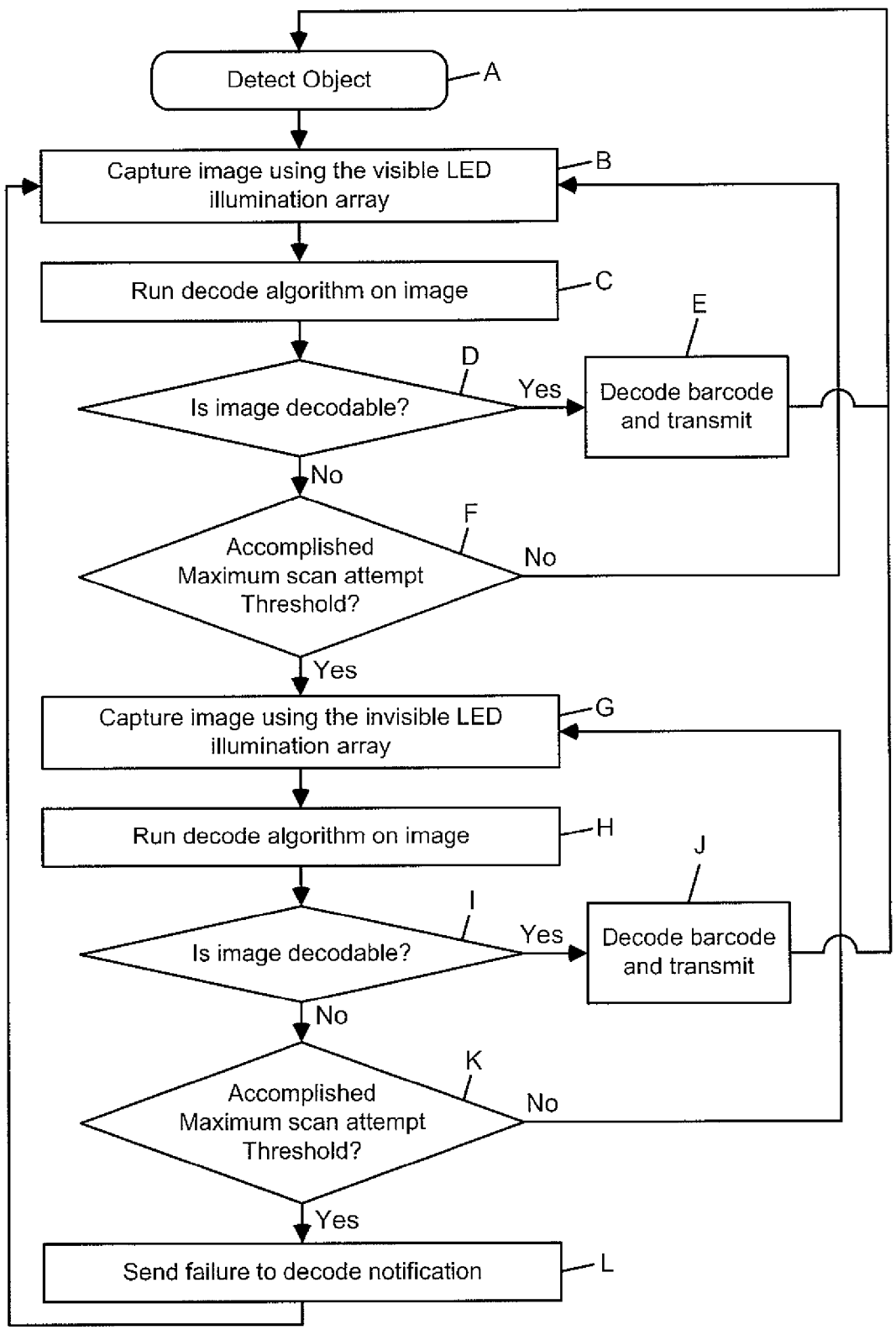
FIG. 4 is flow chart describing the primary steps carried out in the digital-imaging based bar code symbol reading system of FIG. 1, wherein visible and invisible sources of LED illumination are automatically and selectively employed during object illumination and imaging operations, as required to achieve the successful reading of either a visible or invisible bar code symbol within the field of view (FOV) of the system.

The primary function of the LED-based multi-mode illumination subsystem 22 is to produce either (i) a visible wide-area illumination field 36A from the visible LED array 23A when subsystem 22 is operating in its visible illumination mode of operation, or (ii) a invisible (e.g. infrared) wide-area illumination field 36B from the infra-red LED array 23B when subsystem 22 is operating in its invisible/IR illumination mode of operation, wherein the mode of operation depends on the results of real-time analysis performed by the system control subsystem 30 while carrying out its bar code symbol reading method of operation, specified in FIG. 4. Notably, each field of illumination has a narrow optical-bandwidth and is spatially confined within the FOV of the image formation and detection subsystem 21 during modes of illumination and imaging, respectively. This arrangement is designed to ensure that only narrow-band illumination transmitted from the multi-mode illumination subsystem 22, and reflected from the illuminated object, is ultimately transmitted through a narrow-band transmission-type optical filter subsystem 40 within the system and reaches the CMOS area-type image detection array 35 for detection and processing, whereas all other components of ambient light collected by the light collection optics are substantially rejected at the image detection array 35, thereby providing improved SNR, thus improving the performance of the system.

Figure 2A:
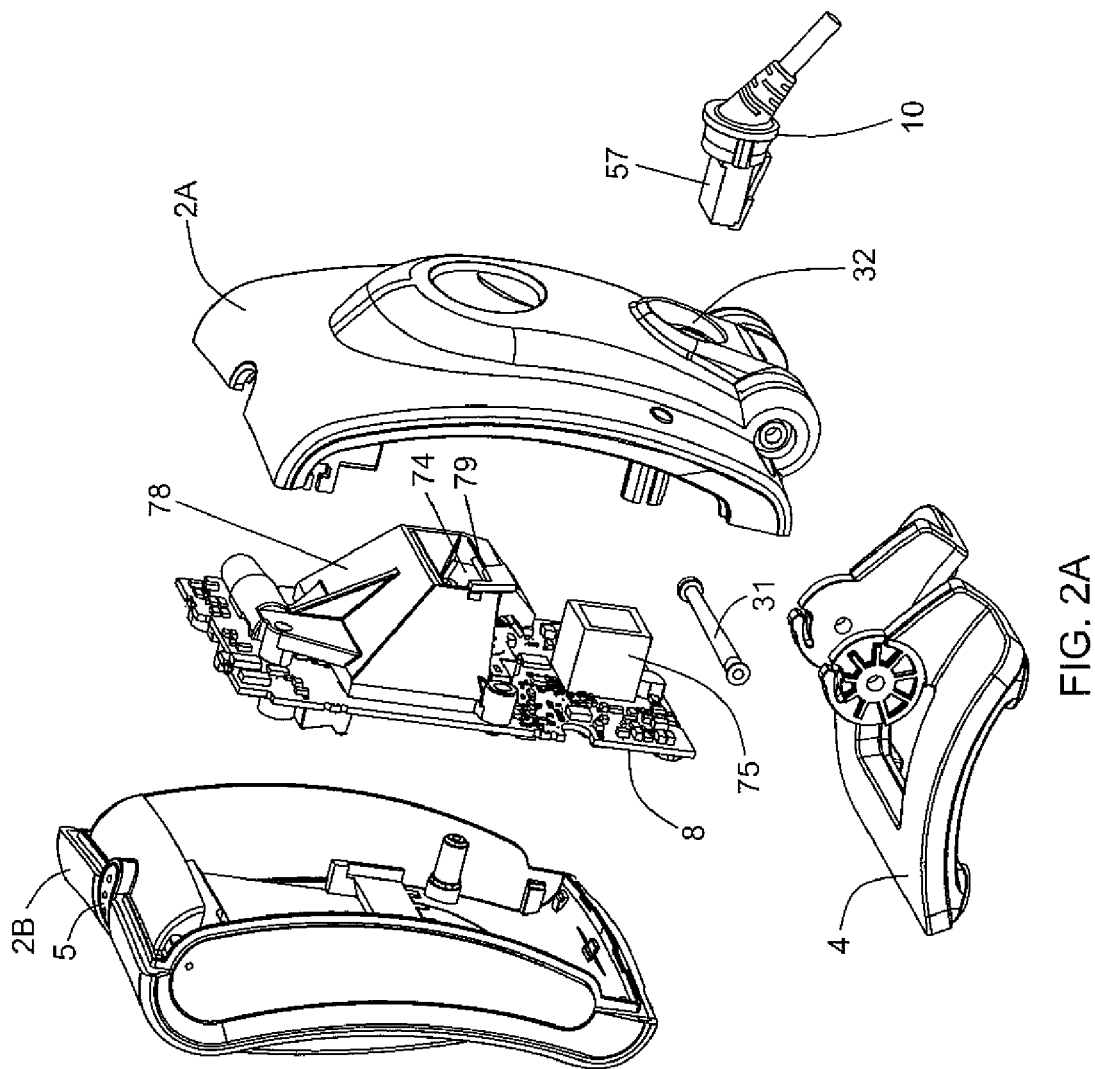
FIG. 2A is a first perspective exploded view of the digital-imaging based bar code symbol reading system of the illustrative embodiment depicted in FIG. 1, showing its printed circuit board assembly arranged between the front and rear portions of the system housing, with the hinged base being pivotally connected to the rear portion of the system housing by way of an axle structure.

The narrow-band transmission-type optical filter subsystem 40 is realized by (1) a high-pass (i.e. red-wavelength reflecting) filter element embodied within at the imaging window 3, and (2) a low-pass filter element mounted either before the CMOS area-type image detection array 35 or anywhere after beyond the high-pass filter element, including being realized as a dichroic mirror film supported on at least one of the FOV folding mirrors 74 and 75, shown in FIGS. 2A and 2B.

As shown in FIG. 2B, the linear array of alternatively spaced visible and IR LEDs 23A and 23B, respectively, 23B is aligned with an illumination-focusing lens structure 130 embodied or integrated within the upper edge of the imaging window 3. Also, the light transmission aperture 60 formed in the PC board 8 is spatially aligned within the imaging window 3 formed in the front housing portion 2A. The function of illumination-focusing lens structure 130 is to focus illumination from the single linear array of LEDs 23, and to uniformly illuminate objects located anywhere within the working distance of the FOV of the system.

As shown in FIGS. 2B, an optically-opaque light ray containing structure 133 is mounted to the front surface of the PC board 8, about the linear array of LEDs 23. The function of the optically-opaque light ray containing structure 133 is to prevent transmission of light rays from the LEDs to any surface other than the rear input surface of the illumination-focusing lens panel 3, which uniformly illuminates the entire FOV of the system over its working range. When the front and rear housing panels 2B and 2A are joined together, with the PC board 8 disposed therebetween, the illumination-focusing lens panel 3 sits within slanted cut-aways formed in the top surface of the side panels, and illumination rays produced from the linear array of LEDs 23A and 23B are either directed through the rear surface of the illumination-focusing lens panel 3 or absorbed by the black colored interior surface of the structure 133.

As shown in FIGS. 2A and 2B the optical component support (OCS) assembly 78 comprises: a first inclined panel for supporting the FOV folding mirror 74 above the FOV forming optics, and a second inclined panel for supporting the second FOV folding mirror 75 above the light transmission aperture 60. With this arrangement, the FOV employed in the image formation and detection subsystem 21, and originating from optics supported on the rear side of the PC board, is folded twice, in space, and then projected through the light transmission aperture and out of the imaging window of the system.

The automatic light exposure measurement and illumination control subsystem 24 performs two primary functions: (1) to measure, in real-time, the power density [joules/cm] of photonic energy (i.e. light) collected by the optics of the system at about its image detection array 35, and to generate auto-exposure control signals indicating the amount of exposure required for good image formation and detection; and (2) in combination with the illumination array selection control signal provided by the system control subsystem 30, to automatically drive and control the output power of the visible and invisible LED arrays 23A and 23B, respectively, employed in the multi-mode illumination subsystem 22, so that objects within the FOV of the system are optimally exposed to either visible or invisible LED-based illumination, as determined by the system control subsystem 30, and optimal images are formed and detected at the image detection array 35. The OCS assembly 78 also comprises a third support panel for supporting the parabolic light collection mirror segment 79 employed in the automatic exposure measurement and illumination control subsystem 24. Using this mirror 78, a narrow light collecting FOV is projected out into a central portion of the wide-area FOV 33 of the image formation and detection subsystem 21 and focuses collected light onto photo-detector 81, which is operated independently from the area-type image sensing array, schematically depicted in FIG. 3 by reference numeral 35.

The primary function of the image capturing and buffering subsystem 25 is (1) to detect the entire 2-D image focused onto the 2D image detection array 35 by the image formation optics 34 of the system, (2) to generate a frame of digital pixel data for either a selected region of interest of the captured image frame, or for the entire detected image, and then (3) buffer each frame of image data as it is captured. Notably, in the illustrative embodiment, the system has both single-shot and video modes of imaging. In the single shot mode, a single 2D image frame (31) is captured during each image capture and processing cycle, or during a particular stage of a processing cycle. In the video mode of imaging, the system continuously captures frames of digital images of objects in the FOV. These modes are specified in further detail in US Patent Application Publication No. US20080314985 A1, incorporated herein by reference in its entirety.

The primary function of the digital image processing subsystem 26 is to process digital images captured and buffered by the image capturing and buffering subsystem 25, under the control of the system control subsystem 30 so that the method of bar code symbol reading described in FIG. 4 is carried out in successful manner. Such image processing operations include the practice of image-based bar code decoding methods, as described in U.S. Pat. No. 7,128,266, incorporated herein by reference.

The primary function of the input/output subsystem 27 is to support universal, standard and/or proprietary data communication interfaces with external host systems and devices, and output processed image data and the like to such external host systems or devices by way of such interfaces. Examples of such interfaces, and technology for implementing the same, are given in U.S. Pat. Nos. 6,619,549 and 6,619,549, incorporated herein by reference in their entirety.

The primary function of the system control subsystem 30 is to provide some predetermined degree of control, coordination and/or management signaling services to each subsystem component integrated within the system, as shown, while carrying out the bar code symbol reading method described in FIG. 4. While this subsystem can be implemented by a programmed microprocessor, in the preferred embodiments, this subsystem is implemented by the three-tier software architecture supported on micro-computing platform as described in U.S. Pat. No. 7,128,266, and elsewhere hereinafter.

The primary function of the manually-activatable trigger switch 5A integrated with the housing is to enable the user, during a manually-triggered mode of operation, to generate a control activation signal (i.e. trigger event signal) upon manually depressing the same (i.e. causing a trigger event), and to provide this control activation signal to the system control subsystem 30 for use in carrying out its complex system and subsystem control operations, described in detail herein.

The primary function of the system configuration parameter table 29 in system memory is to store (in non-volatile/persistent memory) a set of system configuration and control parameters (i.e. SCPs) for each of the available features and functionalities, and programmable modes of supported system operation, and which can be automatically read and used by the system control subsystem 30 as required during its complex operations. Notably, such SCPs can be dynamically managed as taught in great detail in copending US Patent No. US20080314985 A1, incorporated herein by reference.

In general, hand-supportable digital imaging system 1 supports both manually-triggered and automatically-triggered modes of operation, and the method of bar code symbol reading described below can be practiced using either of these triggering techniques.

In FIG. 4, the flow chart describes the method of reading bar code symbols carried out by the digital-imaging based bar code symbol reader 1 shown in FIGS. 1, 2A, 2B and 3 and described above.

As indicated at Block A in FIG. 4, the control subsystem 30 determines if an object has been detected in the field of view (FOV). When the system is operating in its manually-triggered mode, this operation can be achieved by the user pulling the manually pulling trigger switch 5A. When the system is operating in its automatically-triggered mode of operation, this operation can be achieved by the object detection subsystem automatically detecting the presence of an object within the field of view (FOV) of the system. In the event that an object is detected, then at Block B, the system control subsystem 30 enables the image formation and detection subsystem to detect and capture a digital image of the object in the FOV, using a field of visible LED-based illumination generated by illumination subsystem 22. At this stage, the object might bear a visible bar code symbol 16A and/or invisible bar code symbol 16B within the FOV of the system.

At Block C, control subsystem 30 runs a decode algorithm on the captured digital image, and if at Block D, a bar code symbol graphically represented in the digital image is decodable, then at Block E, the bar code symbol is decoded and the symbol character data is transmitted from the I/O subsystem 27 to the host system. If, however, at Block D a bar code symbol is not decodable in the digital image, then control subsystem 30 determines at Block F whether or not the maximum scan attempt threshold has been accomplished, and if not, then the system controller returns to Block B, and resumes the flow as indicated. However, if at Block F, control subsystem 30 determines that the maximum scan attempt threshold has been reached, then control subsystem 30 proceeds to Block G and captures a digital image using invisible (e.g. IR) illumination.

At Block H in FIG. 4, one or more decode algorithms are run on the captured digital image, and at Block I, the system controller determines whether or not a bar code symbol is decoded within the digital image. If at Block I a bar code symbol is decoded within the digital image, then at Block J the bar code symbol is decoded and symbol character data produced is transmitted to the host system, and system control returns to Block A, as indicated in FIG. 4. If, however, at Block I, no bar code symbol is decoded, then control subsystem 30 determines whether or not the maximum scan attempt threshold (i.e. how many attempts to decode are permitted) has been reached or attained, and so long as the maximum number has not been reached, control subsystem 30 maintains a control loop between Blocks K and G, as indicated in FIG. 4. When the maximum number of attempts to decode has been reached at Block K, then system controller sends a failure to decode notification to the operator, and the system returns to Block B, as shown in FIG. 4.

The above method of imaging-based based bar code symbol reading and control of operation is carried out in an automated manner, within the laser scanning bar code symbol reader 1, wholly transparent to the operator who is holding the system in his or her hand. By virtue of this unique method of control, the system is capable of reading both visible and invisible bar code symbols in a user-transparent manner using visible/invisible illumination switching during digital image capture and processing operations, without the complexities presented by prior art techniques and technologies.

Figure 5:
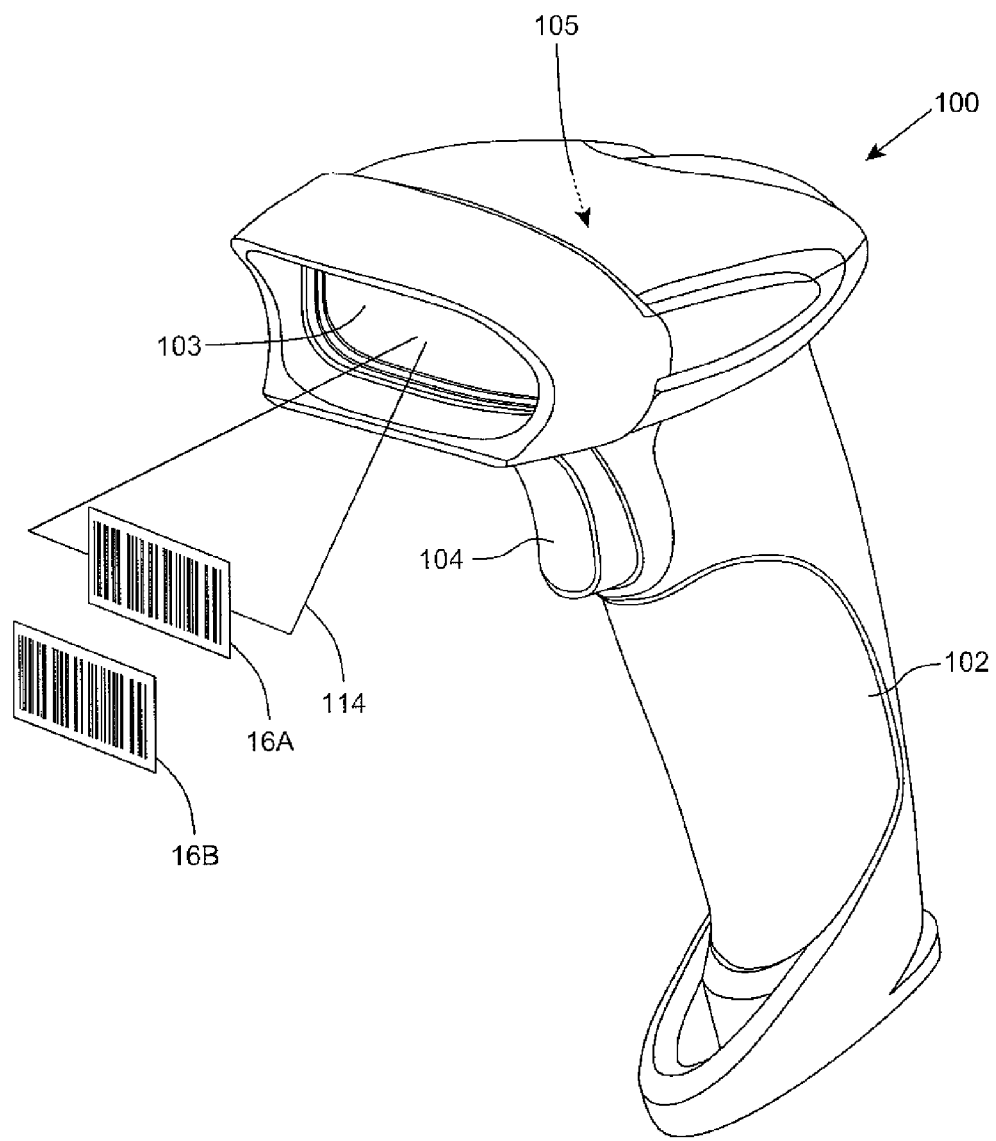
FIG. 5 is a perspective view of a hand-supportable laser scanning bar code symbol reading system of the second illustrative embodiment of the present disclosure.
Figure 6:
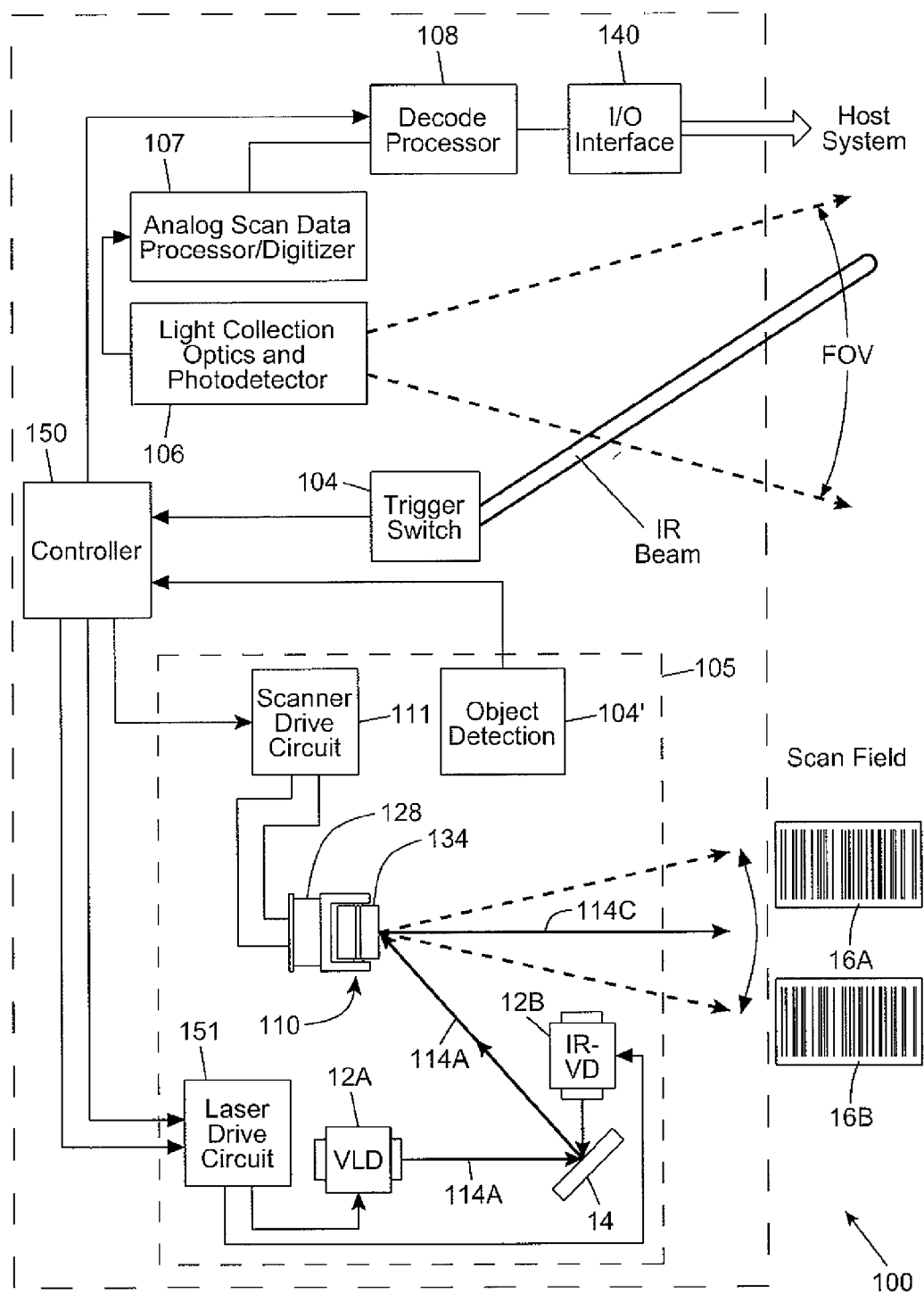
FIG. 6 is a schematic representation of the laser scanning bar code symbol reader of the second illustrative embodiment.
Figure 7:
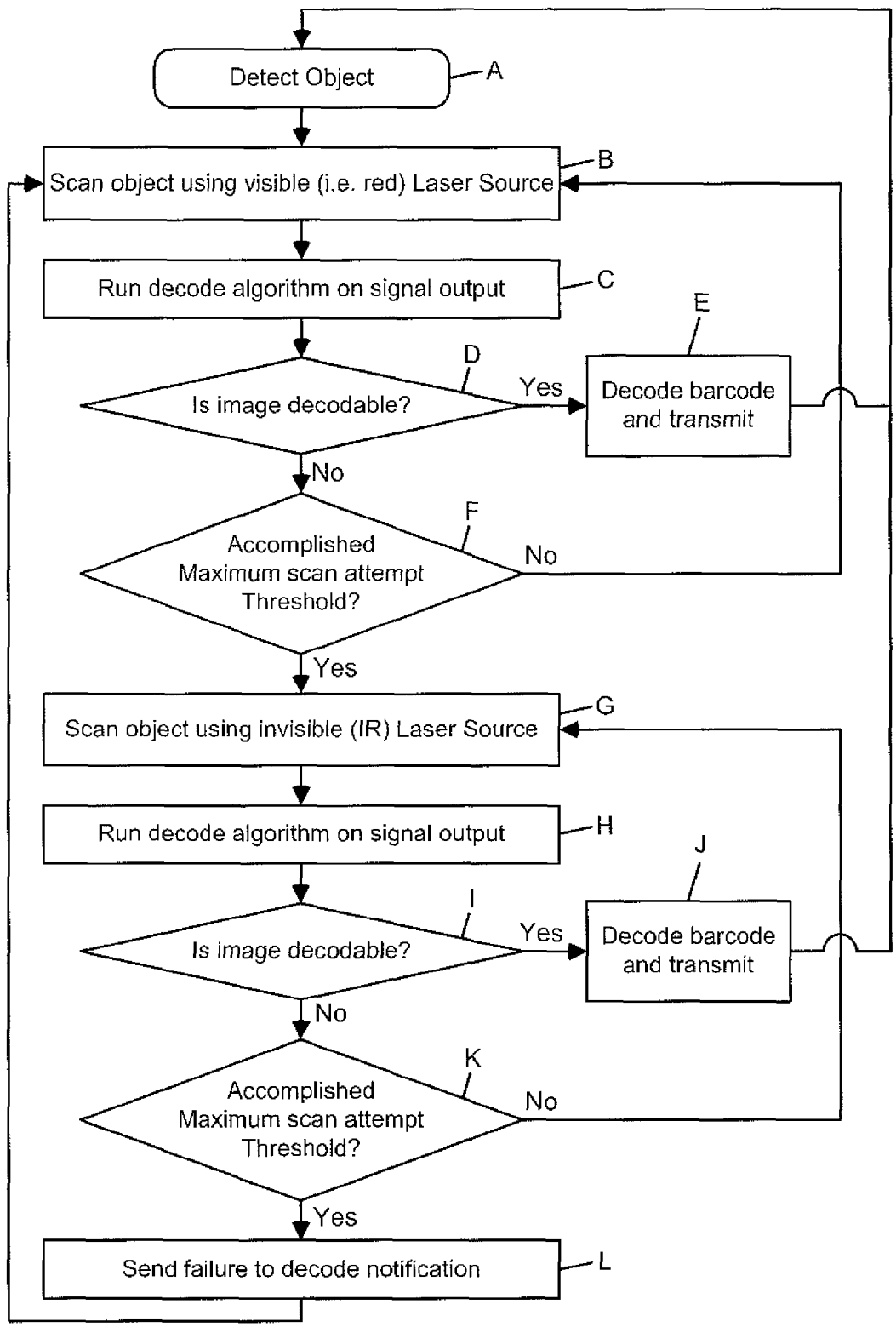
FIG. 7 is a flow chart describing the primary steps carried out in the laser scanning based bar code symbol reading system of FIG. 1, wherein visible and invisible sources of laser diode (LD) illumination are automatically and selectively employed during object illumination and imaging operations, as required to achieve the successful reading of either a visible or invisible bar code symbol within the field of view (FOV) of the system.

Hand-Supportable Laser-Scanning Bar Code Symbol Reading System of the Illustrative Embodiment As shown in FIGS. 5 and 6 the bar code symbol reader 100 comprises: a hand-supportable housing 102; a light transmission window 103 integrated with the housing 102; a manually-actuated trigger switch 104 for activating its laser scanning module 105 with a laser scanning field; an IR-based object detection circuit 104' for automatically triggering the system when an object is automatically detected in the scanning field; a multi-mode laser scanning module 110, for scanning either (i) a visible laser beam generated by a visible laser source 112A in response to a first control signal generated by a system controller 150 when the module 110 is operating in its visible illumination mode of operation, or (ii) an invisible laser beam generated by an invisible (i.e. infrared or IR) source 112B (e.g. IR laser diode or LD), in response to a second control signal generated by the system controller 150 when the module is operating in its invisible/IR illumination mode of operation, wherein the mode of operation depends on the results of real-time analysis performed by the system controller 150 while carrying out its bar code symbol reading method of operation, specified in FIG. 7; wherein the multi-mode laser scanning module 110 also includes a laser drive circuit 151 for receiving first and second control signals from system controller 150, and in response thereto, generating and delivering first and second laser (diode) drive current signals to the visible laser source 112A and the invisible/IR laser diode source 112B, respectively, to produce visible and invisible laser scanning beams alternatively during the method of bar code symbol reading described in FIG. 7; light collection optics 106 for collecting light reflected/scattered from scanned object in the scanning field, and a photo-detector for detecting the intensity of collected light and generating an analog scan data signal corresponding to said detected light intensity during scanning operations; an analog scan data signal processor/digitizer 107 for processing the analog scan data signals and converting the processed analog scan data signals into digitized data signals; programmed decode processor 108 for decode processing digitized data signals, and generating symbol character data representative of each bar code symbol scanned by either a visible or invisible laser scanning beam; an input/output (I/O) communication interface module 140 for interfacing with a host communication system and transmitting symbol character data thereto via wired or wireless communication links that are supported by the symbol reader and host system; and a system controller 150 for generating the necessary control signals for controlling operations within the hand-supportable laser scanning bar code symbol reading system.

As shown in FIG. 6, the multi-mode laser scanning module 105 comprises a number of subcomponents, namely: laser scanning assembly 110 with an electromagnetic coil 128 and rotatable scanning element 134 supporting a lightweight reflective element; a coil drive circuit 111 for generating an electrical drive signal to drive the electromagnetic coil 128 in the laser scanning assembly 110; and a visible laser beam source (visible VLD) 112a for producing a visible laser beam 113A and an invisible laser beam source (infrared or IR laser diode LD) 112B; and a beam deflecting mirror 114 for deflecting the laser beam 113A from either laser beam source 112A or 112B (depending on which source is enabled at any instant in time by controller 150), towards the mirror component of the laser scanning assembly 110, which sweeps the laser beam 113C across its scan field and one or more visible and/or invisible bar code symbols 16A, 16B that might be simultaneously present in such a scan field during system operation.

As shown in FIG. 6, the multi-mode laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 134) and which is driven by a drive circuit 111 so that it generates magnetic forces on opposite poles of the permanent magnet 134, during scanning assembly operation.

In general, system 100 supports both manually-triggered and automatically-triggered modes of operation, and the method of bar code symbol reading described below can be practiced using either of these triggering techniques.

In response to a triggering event in either of the above-described modes of triggered operation, the laser scanning module 105 generates and projects a laser scanning beam through the light transmission window, and across the laser scanning field external to the hand-supportable housing, for scanning an object in the scanning field. The laser scanning beam is generated by either the visible laser beam source 112A or the invisible (IR) laser beam source 112B in response control signals generated by the system controller 150. The scanning element (i.e. mechanism) 134 repeatedly scans the visible laser beam, or invisible laser beam, depending on the state of operation at any instant in time, across any visible and/or invisible code symbols residing on the object in the laser scanning field. Then, the light collection optics 106 collects light reflected/scattered from scanned code symbols on the object in the scanning field, and the photo-detector (106) automatically detects the intensity of collected light (i.e. photonic energy) and generates an analog scan data signal corresponding to the light intensity detected during scanning operations. The analog scan data signal processor/digitizer 107 processes the analog scan data signals and converts the processed analog scan data signals into digitized data signals. The programmed decode processor 108 decode processes digitized data signals, and generates symbol character data representative of each bar code symbol scanned by either a visible or invisible laser scanning beam. Symbol character data corresponding to the visible and/or invisible bar codes read by the decoder 108, are then transmitted to the host system via the I/O communication interface 140 which may support either a wired and/or wireless communication link, well known in the art. During object detection and laser scanning operations, the system controller 150 generates the necessary control signals for controlling operations within the hand-supportable laser scanning bar code symbol reading system.

In FIG. 7, the flow chart describes the method of reading bar code symbols carried out by the laser scanning based bar coded reader 100 shown in FIGS. 5 and 6 and described above.

As indicated at Block A in FIG. 7, the system controller determines if an object has been detected in the field of view (FOV). When the system is operating in its manually-triggered mode, this operation can be achieved by the user pulling the manually pulling trigger switch 5A. When the system is operating in its automatically-triggered mode of operation, this operation can be achieved by the object detection sub-system automatically detecting the presence of an object within the field of view (FOV) of the system.

In the event that an object is detected, then the object is scanned with a beam of visible laser illumination generated by VLD 112A, at Block B.

At Block C, the system controller 150 runs a decode algorithm on the captured scan data, and if at Block D, a bar code symbol is decodable, then at Block E, the bar code symbol is decoded and the symbol character data is transmitted to the host system. If, however, at Block D a bar code symbol is not decodable, then the system controller 150 determines at Block F whether or not the maximum scan attempt threshold has been reached, and if not, then the system controller 150 returns to Block B, and resumes the flow as indicated. However, if at Block F, the system controller 150 determines that the maximum scan attempt threshold has been accomplished, then the system controller 150 proceeds to Block G and scans the object using an invisible (e.g. IR) laser illumination beam, generated by IR VD 112B.

At Block H in FIG. 7, one or more decode algorithms are run on the collected scan data, and at Block I, the system controller 150 determines whether or not a bar code symbol is decoded. If at Block I a bar code symbol is decoded, then at Block J the bar code symbol is decoded and symbol character data produced is transmitted to the host system, and system control returns to Block A, as shown in FIG. 7. If, however, at Block I, no bar code symbol is decoded, then the system controller 150 determines whether or not the maximum scan attempt threshold (i.e. how many attempts to decode are permitted) has been reached, and so long as the maximum number has not been reach, the system controller 150 maintains a control loop between Blocks K and G, as indicated in FIG. 7. When the maximum number of attempts to decode has been reached at Block K, then system controller 150 sends a failure to decode notification to the operator, and the system returns to Block B, as shown in FIG. 7.

The above method of laser scanning based bar code symbol reading and control of operation is carried out in an automated manner, within the laser scanning bar code symbol reader 100, wholly transparent to the operator who is holding the system in his or her hand. By virtue of this unique method of control, the system is capable of reading both visible and invisible bar code symbols in a user-transparent manner using visible/invisible illumination switching during digital image capture and processing operations, without the complexities presented by prior art techniques and technologies.

Some Modifications which Readily Come to Mind

While the first illustrative embodiment disclosed the use of a 2D image detection array to detect digital images of visible and invisible bar code symbols, it is understood that 1D or linear image detection arrays can be used as well, to produce 1D digital images which are processed alone, or which are combined sequentially together to form 2D digital images prior to digital image processing.

Also, the second illustrative embodiment disclosed the use of a 1D laser scanning module to detect scan visible and/or invisible bar code symbols on objects, it is understood that a 2D or raster-type laser scanning module can be used as well, to generate scan data signals for decoding processing.

While the illustrative embodiments disclose switching sources of visible and invisible (i.e. infrared) illumination during data capture and processing operations, to read visible and/or invisible code symbols on objects in a user-transparent manner, it is understood that such illumination source switching operations can be carried out in various ways, including toggling between (i) a visible illumination source for a predetermined number of data capture (i.e. digital image frames or scan data scans) and processing operations (i.e. cycles), and (ii) an invisible illumination source for a predetermined number of data capture and processing operations, for each triggering event within the system.

Also, the illustrative embodiment have been described in connection with various types of bar code symbol reading applications involving 1-D and 2-D bar code structures, it is understood that the present invention can be used to read (i.e. recognize) any machine-readable indicia, dataform, or graphically-encoded form of intelligence, including, but not limited to bar code symbol structures, alphanumeric character recognition strings, handwriting, and diverse dataforms currently known in the art or to be developed in the future. Hereinafter, the term "code symbol" shall be deemed to include all such information carrying structures and other forms of graphically-encoded intelligence.

It is understood that the digital-imaging based bar code symbol reading system of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope of the claims appended hereto.

The invention claimed is:

1. A digital-imaging code symbol reading system comprising:
    a hand-supportable housing having alight transmission aperture;
    an image formation and detection subsystem, disposed in said hand-supportable housing, having image formation optics for producing, and projecting a field of view (FOV) through said light transmission aperture and onto an area-type image detection array for detecting one or more digital images of an object within said FOV supporting one or more visible and/or visible code symbols, during object illumination and imaging operations;
    a multi-mode illumination subsystem, disposed in said hand-supportable housing, said multi-mode illumination subsystem includes:
    (i) a visible illumination array for producing a field of visible illumination within said FOV, and illuminating a visible code symbol on said object detected in said FOV, so that said illumination reflects off said object and is transmitted back through said light transmission aperture and onto said image detection array to form said digital image of said visible code symbol, and
    (ii) an invisible illumination array for producing a field of invisible illumination within said FOV, and illuminating an invisible code symbol on said object detected in said FOV, so that said illumination reflects off said object and is transmitted back through said light transmission aperture and onto said image detection array to form said digital image of said invisible code symbol;
    an image capturing and buffering subsystem, disposed in said hand-supportable housing, for capturing and buffering digital images of visible and/or invisible code symbols detected by said image formation and detection subsystem;
    a digital image processing subsystem, disposed in said hand-supportable housing, for processing said one or more digital images of visible and/or invisible code symbols captured and buffered by said image capturing and buffering subsystem and reading visible and/or invisible bar code symbols represented in said digital images;
    an input/output subsystem, disposed in said hand-supportable housing, for outputting processed image data to an external host system or other information receiving or responding device; and
    a system control subsystem, disposed in said hand-supportable housing, and responsive to a triggering event to initiate object illumination and imaging operations within said digital-imaging code symbol reading system, and controlling and/or coordinating said subsystems within said digital-imaging code symbol reading system, during object illumination and imaging operations;
    wherein upon detecting said triggering event, said system controller generates a first control signal, and in response thereto, said multi-mode illumination subsystem generates said field of visible illumination within said FOV, and illuminates any visible code symbol on said object detected in said FOV, so that said visible illumination reflects off said visible code symbol and is transmitted back through said light transmission aperture and onto said image detection array to form said digital image of said visible code symbol, and thereafter said digital image is decoded processed by said digital image processing subsystem in effort to read said visible code symbol on said object;
    wherein, in the event that said visible code symbol is not read after a predetermined number of illumination, imaging and processing attempts, then said system control subsystem generates a second control signal, said multi-mode illumination subsystem generates said field of invisible illumination within said FOV, and illuminates any invisible code symbol on said object detected in said FOV, so that said invisible illumination reflects off said invisible bar code symbol and is transmitted back through said light, transmission aperture and onto said image detection array to form said digital image of said invisible code symbol, and thereafter said digital image is decoded processed by said digital image processing subsystem in effort to read said invisible bar code symbol on said object; and
    wherein, in the event that said invisible code symbol is not read after a predetermined number of illumination, imaging and processing attempts, then said system control subsystem resumes detection of a subsequent triggering event.

2. The digital-imaging code symbol reading system of claim 1, which further comprises an automatic object detection subsystem, disposed in said hand-supportable housing, for automatically detecting the presence of said object within said FOV and generating said triggering event.

3. The digital-imaging code symbol reading system of claim 1, which further comprises a manual trigger switch for generating said triggering event whenever an operator manually actuates said manual trigger switch.

4. The digital-imaging code symbol reading system of claim 1, which further comprises an illumination control subsystem, disposed in said hand-supportable housing, for controlling the operation of said visible and invisible illumination arrays within said multi-mode illumination subsystem.

5. The digital-imaging based code symbol reading system of claim 1, wherein said visible illumination array comprises an array of visible LEDs, and said invisible illumination array comprises an array of invisible LEDs.

6. The digital-imaging code symbol reading system of claim 1, wherein said visible and/or invisible code symbols are symbols selected from the group consisting of 1D bar code symbols, 2D bar code symbols and data-matrix type code symbols.

7. A method of reading code symbols carried out by a digital-imaging based code symbol reading system, comprising the steps of:
(a) bringing in proximity with an object bearing one or more visible and/or invisible code symbols, a digital-imaging based bar code symbol reading system having a hand-supportable housing with a light transmission window and containing (i) an image formation and detection subsystem for forming and detecting digital images of objects within a field of view (FOV) of said image formation and detection subsystem, (ii) an illumination subsystem for generating either a field of visible illumination with said FOV or a field of invisible illumination within said FOV, (iii) a digital image processing subsystem for processing digital images, (iv) an input/output subsystem, and (v) a system control subsystem;
(b) detecting an object in said FOV of said image formation and detection subsystem and generating a triggering event;
(c) in response to the generation of said triggering event, said image formation and detection subsystem detecting and capturing a digital image of an said object in the FOV while being illuminated with said field of visible illumination generated by said illumination subsystem;
(d) said digital image processing subsystem processing said digital image in effort to read said visible bar code symbol graphically represented in said digital image detected in step (c);
(e) in the event that said digital image processing subsystem reads the visible bar code symbol during step (d), then said digital image processing subsystem producing symbol character data representative of said read visible bar code symbol, and said input/output subsystem transmitting said symbol character data to a host system;
(f) in the event that said digital image processing subsystem cannot read said visible bar code symbol during step (d) after one or more attempts at doing so, then said image formation and detection subsystem detects and captures said digital image of said object in the FOV while being illuminated with said field of invisible illumination generated by said illumination subsystem;
(g) said digital image processing subsystem processing said digital image detected in step (e) in effort to read an invisible bar code symbol graphically represented in said digital image detected in step (f);
(h) in the event that said digital image processing subsystem reads said invisible bar code symbol during step (g), then said digital image processing subsystem producing symbol character data representative of said read invisible bar code symbol, and said input/output subsystem transmitting said symbol character data to said host system; and
(i) in the event that said digital image processing subsystem cannot read an invisible bar code symbol during step (g) after one or more attempts at doing so, then said system control subsystem returns control to step (b) and resumes object detection or re-detection operations.

8. The method of claim 7, wherein step (b) comprises generating said triggering event by actuating a manual trigger switch integrated with said hand-supportable housing.

9. The method of claim 7, wherein step (b) comprises generating said triggering event by automatically detecting said object in said FOV using an automatic objection detector disposed in said hand-supportable housing.

10. The method of claim 7, wherein said visible and/or invisible code symbols are symbols selected from the group consisting of 1D bar code symbols, 2D bar code symbols and data-matrix type code symbols.

11. A hand-supportable laser scanning code symbol reading system for reading visible and/or invisible code symbols in a user-transparent manner using visible/invisible illumination switching during scan data detection and processing operations, comprising:
a hand-supportable housing with a light transmission window;
a multi-mode laser scanning module, disposed in said hand-supportable housing, responsive to first and second control signals generated by a system controller, wherein said multi-mode laser scanning module includes:
(i) a laser drive module for driving a visible laser source to produce a visible laser beam in response to receiving said first control signal from said system controller, and for driving an invisible laser source to produce an invisible laser beam in response to receiving said second control signal from said system controller, and
(ii) a laser scanning mechanism for scanning said visible laser beam across a laser scanning field defined external to said light transmission window, and any visible code symbol on an object in said laser scanning field, and for scanning said invisible laser beam across said laser scanning field and any invisible code symbol on said object in said laser scanning field;
light collection optics, disposed in said hand-supportable housing, for collecting light reflected/scattered from scanned object in said laser scanning field;
a photo-detector, disposed in said hand-supportable housing, for detecting the intensity of collected light from said code symbols, and generating an analog scan data signal corresponding to said detected light intensity during laser scanning operations;
an analog scan data signal processor, disposed in said hand-supportable housing, for processing said analog scan data signals and converting the processed analog scan data signals into digitized data signals;
a programmed decode processor, disposed in said hand-supportable housing, for decode processing said digitized data signals, and generating symbol character data representative of each visible code symbol scanned by said visible laser beam and each invisible code symbol scanned by said invisible laser beam; and
an input/output (I/O) communication interface, disposed in said hand-supportable housing, for interfacing with a host system and transmitting symbol character data to said host system, via a wired or wireless communication link, supported by said hand-supportable laser scanning code symbol reading system and said host system; and
said system controller for controlling and/or orchestrating operations within said hand-supportable laser scanning bar code symbol reading system;
wherein when said system controller generates said first control signal, said visible laser source generates said visible laser beam and said laser scanning mechanism scans said visible laser beam across any visible code symbol on said object in said laser scanning field during laser scanning operations, so as to generate said analog scan data signal which is processed and converted into a digitized data signal, which is then decoded processed in effort to read said visible bar code symbol on said object;

wherein, in the event that said visible code symbol is not read after a predetermined number of scanning and decode processing attempts, then said system controller generates said second control signal, said invisible laser source generates said invisible laser beam and said laser scanning mechanism scans said invisible laser beam across any invisible code symbol on said object located in said laser scanning field during laser scanning operations, so as to generate said analog scan data signal which is processed and converted into a digitized data signal, which is then decoded processed in effort to read said invisible bar code symbol on said object; and wherein, in the event that said invisible code symbol is not read after a predetermined number of scanning and decode processing attempts, then said system controller returns to detecting or re-detecting an object in said laser scanning field.

12. The hand-supportable laser scanning code symbol reading system of claim 11, which further comprises a manual trigger switch for generating a trigger event upon an operator actuating said manual trigger switch.

13. The hand-supportable laser scanning code symbol reading system of claim 11, which further comprises object detection circuit for generating a triggering event when said object is automatically detected in said FOV.

14. The hand-supportable laser scanning code symbol reading system of claim 11, wherein said visible and/or invisible code symbols are symbols selected from the group consisting of 1D bar code symbols, 2D bar code symbols and data-matrix type code symbols.

15. A method of reading visible and/or, invisible code symbols in a user-transparent manner using visible/invisible illumination switching during scan data detection and processing operations, comprising the sequence of steps of:

(a) bringing a hand-supportable laser scanning code symbol reading system in proximity with an object bearing one or more visible and/or invisible code symbols, a said hand-supportable laser scanning code symbol reading system including a hand-supportable housing with a light transmission window and containing components including:

(i) a laser scanning module, disposed in said hand-supportable housing, responsive to first and second control signals generated by a system controller, wherein said laser scanning module includds (1) a laser drive module for driving a visible laser source to produce a visible laser beam in response to receiving said first control signal from said system controller, and for driving an invisible laser source to produce an invisible laser beam in response to receiving said second control signal from said system controller, and (2) a laser scanning mechanism for scanning said visible laser beam across a laser scanning field defined external to said light transmission window, and any visible code symbol on said object in said laser scanning field, and for scanning said invisible laser beam across said laser scanning field and any invisible code symbol on said object in said laser scanning field;

(ii) light collection optics for collecting light reflected/scattered from scanned object in the scanning field, and a photo-detector for detecting the intensity of collected light and generates an analog scan data signal corresponding to the detected light intensity during scanning operations;

(iii) an analog scan data signal processor, disposed in said hand-supportable housing, for processing said analog scan data signals and converting the processed analog scan data signals into digitized data signals;

(iv) a programmed decode processor, disposed in said hand-supportable housing, for decode processing said digitized data signals, and generating symbol character data representative of each visible code symbol scanned by said visible laser beam and each invisible code symbol scanned by said invisible laser beam; and (v) an I/O communication interface for transmitting symbol character data to a host system;

(b) detecting said object in said laser scanning field and generating a triggering event;

(c) in response to the generation of said triggering event, said visible laser beam source generating said visible laser beam, said laser scanning mechanism repeatedly scanning said visible laser beam across any visible code symbol on the object in said laser scanning field, said light collection optics collecting light reflected/scattered from said scanned visible code symbol in said laser scanning field, said photo-detector automatically detecting the intensity of collected light and generating said analog scan data signal corresponding to the light intensity detected during scanning operations, said analog scan data processor processing said analog scan data signal and converting the processed analog scan data signal into a first digitized data signal;

(d) said decode processor processing said first digitized data signal in effort to read a visible code symbol scanned during step (c);

(e) in the event that said decode processor reads said visible code symbol during step (d), then said decode processor producing symbol character data representative of said visible bar code symbol, and said I/O communication interface transmitting said symbol character data to said host system;

(f) in the event that said decode processor cannot read a visible bar code symbol during step (d) after one or more attempts at doing so, then said invisible laser beam source generating said invisible laser beam, said laser scanning mechanism repeatedly scanning said invisible laser beam across any invisible code symbol on the object in said laser scanning field, said light collection optics collecting light reflected/scattered from said scanned invisible code symbol in said laser scanning field, said photo-detector automatically detecting the intensity of collected light and generating said analog scan data signal corresponding to the light intensity detected during scanning operations, said analog scan data processor processing said analog scan data signal and converting the processed analog scan data signal into a second digitized data signal;

(g) said decode processor processing said second digitized data signal in effort to read an invisible code symbol scanned during step (f);

(h) in the event that said decode processor reads an invisible bar code symbol during step (g), then said decode processor producing symbol character data representative of said invisible bar code symbol, and said I/O communication interface transmitting said symbol character data to said host system; and (i) in the event that said decoder processor cannot read an invisible bar code symbol during step (g) after one or more attempts at doing so, then said system controller returns control to step (b) and resumes object detection operations.

16. The method of claim 15, wherein step (b) comprises generating said triggering event by actuating a manual trigger switch integrated with said hand-supportable housing.

17. The method of claim 15, wherein step (b) comprises generating said triggering event by automatically detecting said object in said FOV using an automatic objection detector disposed in said hand-supportable housing.

18. The method of claim 15, wherein said visible and/or invisible code symbols are symbols selected from the group consisting of 1D bar code symbols, 2D bar code symbols and data-matrix type code symbols.

* * * * *